US010993201B2

(12) United States Patent
Luecke

(10) Patent No.: US 10,993,201 B2
(45) Date of Patent: Apr. 27, 2021

(54) LOCATION AWARE NETWORKING FOR AD-HOC NETWORKS AND METHOD THEREFOR

(71) Applicant: BENCHMARK ELECTRONICS, INC., Scottsdale, AZ (US)

(72) Inventor: Jim Luecke, Scottsdale, AZ (US)

(73) Assignee: BENCHMARK ELECTRONICS, INC., Tempe, AZ (US)

( * ) Notice: Subject to any disclaimer, the term of this patent is extended or adjusted under 35 U.S.C. 154(b) by 198 days.

(21) Appl. No.: 16/229,325

(22) Filed: Dec. 21, 2018

(65) Prior Publication Data
US 2019/0215795 A1  Jul. 11, 2019

Related U.S. Application Data

(60) Provisional application No. 62/577,566, filed on Oct. 26, 2017.

(51) Int. Cl.
*H04L 29/08*  (2006.01)
*H04W 64/00*  (2009.01)
(Continued)

(52) U.S. Cl.
CPC ............ *H04W 64/003* (2013.01); *G01S 5/22* (2013.01); *H04L 45/126* (2013.01);
(Continued)

(58) Field of Classification Search
None
See application file for complete search history.

(56) References Cited

U.S. PATENT DOCUMENTS 6,744,740 B2   6/2004  Chen
7,903,631 B2   3/2011  Ross et al.
(Continued)

FOREIGN PATENT DOCUMENTS

CN   101808390   8/2010
CN   102300281   3/2014
(Continued)

OTHER PUBLICATIONS

Grid and Cluster Matrix Computation With Persistent Storage and Out-of-Core Programming https://ieeexplore.ieee.org/document/4154114.

*Primary Examiner* — Sithu Ko
(74) *Attorney, Agent, or Firm* — Weiss & Moy, P.C.; Jeffrey D. Moy

(57) ABSTRACT

A method for location aware networking in a wireless ad-hoc network having a plurality of wireless nodes in a geographic area comprising: dividing the geographic area into a plurality of grids; determining a location of a particular wireless node; determining a corresponding grid where the particular wireless node resides; determining a cluster head for the corresponding grid; connecting corresponding wireless nodes in the corresponding grid to the cluster head, wherein the cluster head of the corresponding grid periodically gather data from the corresponding wireless nodes, aggregate the data and transmits the data to a gateway; and coupling the cluster head of the corresponding grid to cluster heads of each of the plurality of grids forming a pathway to the gateway, the cluster head of the corresponding grid transmitting the data through the pathway or directly to the gateway.

16 Claims, 7 Drawing Sheets

(51) Int. Cl.
| | |
|---|---|
| *H04W 74/08* | (2009.01) |
| *H04W 74/02* | (2009.01) |
| *H04W 8/00* | (2009.01) |
| *H04W 88/18* | (2009.01) |
| *G01S 5/22* | (2006.01) |
| *H04W 56/00* | (2009.01) |
| *H04L 12/733* | (2013.01) |
| *H04W 16/18* | (2009.01) |
| *H04W 52/02* | (2009.01) |
| *H04W 72/04* | (2009.01) |
| *H04W 84/18* | (2009.01) |

(52) U.S. Cl.
CPC .......... *H04W 8/005* (2013.01); *H04W 16/18* (2013.01); *H04W 52/0206* (2013.01); *H04W 56/002* (2013.01); *H04W 64/00* (2013.01); *H04W 74/02* (2013.01); *H04W 74/0816* (2013.01); *H04W 88/184* (2013.01); *H04W 72/0446* (2013.01); *H04W 84/18* (2013.01)

(56) References Cited

U.S. PATENT DOCUMENTS

| | | |
|---|---|---|
| 9,651,388 B1 | 5/2017 | Chapman et al. |
| 2003/0093694 A1 | 5/2003 | Medvinsky et al. |
| 2003/0117966 A1* | 6/2003 | Chen ............... H04L 45/46 370/255 |
| 2008/0189394 A1* | 8/2008 | Ross ............... H04W 16/02 709/219 |
| 2009/0017837 A1* | 1/2009 | Kim, II ............... G01S 5/10 455/456.1 |
| 2009/0285136 A1* | 11/2009 | Sun ............... H04L 45/20 370/310 |
| 2009/0300760 A1 | 12/2009 | Chitor et al. |
| 2010/0085893 A1* | 4/2010 | Kim ............... H04W 40/24 370/254 |
| 2011/0130162 A1* | 6/2011 | Park ............... H04W 28/06 455/507 |
| 2011/0218759 A1* | 9/2011 | Jin ............... G01S 5/0289 702/150 |
| 2011/0310770 A1* | 12/2011 | Liang ............... H04W 84/18 370/254 |
| 2012/0231786 A1 | 9/2012 | Ling et al. |
| 2014/0316736 A1* | 10/2014 | Strohbach ............... H04W 84/18 702/127 |
| 2015/0223143 A1* | 8/2015 | Celebi ............... H04W 24/02 455/446 |
| 2015/0226854 A1* | 8/2015 | Raghupathy ............... G01S 5/145 342/357.43 |
| 2016/0295435 A1* | 10/2016 | Baroudi ............... H04L 41/12 |
| 2016/0315774 A1* | 10/2016 | Faruque ............... H04L 63/06 |
| 2016/0379672 A1 | 12/2016 | Smus et al. |
| 2017/0195412 A1* | 7/2017 | Abu-Ghazaleh ............... H04L 47/70 |

FOREIGN PATENT DOCUMENTS

| | | |
|---|---|---|
| CN | 105898822 | 8/2016 |
| KR | 100660025 | 12/2006 |
| WO | 2017056111 | 4/2017 |

\* cited by examiner

LOCATION AWARE NETWORKING FOR AD-HOC NETWORKS AND METHOD THEREFOR

RELATED APPLICATIONS

This patent application is related to U.S. Provisional Application No. 62/577,566 filed Oct. 26, 2017, entitled "INTERNET OF THINGS (IOT) ARCHITECTURE" in the names of Hiep Truong, Kevin Nguyen, Ron Hobbs, and Jim Luecke, and which is incorporated herein by reference in its entirety. The present patent application claims the benefit under 35 U.S.C § 119(e). This patent application is also related to U.S. patent application Ser. No. 16/041,047 filed Jul. 20, 2018, entitled "MESH RANGING AND NETWORK MESSAGE AND SLOT STRUCTURE FOR AD-HOC NETWORKS AND METHOD THEREFOR" in the names of Hiep Truong, Kevin Nguyen and which is incorporated herein by reference in its entirety.

TECHNICAL FIELD

The present application relates generally to the technical field of wireless networks, and more specifically, to the technical field of a wireless network wherein wireless nodes cooperatively work together to determine node location and wherein a cluster head is determined for routing of data and to minimize power consumption.

BACKGROUND

An ad hoc wireless network may be defined as a network that may be composed of individual devices wireless communicating with each other directly. These types of networks may bypass a central access point such as a router. Ad hoc wireless networks may eliminate the complexities of infrastructure setup and administration, enabling wireless devices to create and join networks on-the-fly-anywhere-anytime, for virtually any application. Ad hoc wireless networks may exist without any existing stationary infrastructure.

Ad hoc wireless networks and wireless sensor networks are often deployed in an ad hoc fashion, that is, their location is generally not known a priori, creating a dynamic nature of wireless nodes/sensor nodes. Furthermore, in many situations, it is very difficult to establish wireless infrastructure to provide reference nodes such as a base station or hub.

Many ad hoc wireless system applications may require ad-hoc localization techniques. For example, in the wireless sensor network domain, wireless sensor nodes are typically randomly deployed. In many situations, GPS location information may be unavailable and/or does not work in all places. GPS location information may be prohibitive due to cost and power requirements. In another example, sensor network operations and services may rely on the knowledge of sensor positions, including coverage area management, and geographic-aware routing for more efficient data routing (i.e., multi-hops data routing) in larger networks that span large geographic regions.

Thus, a wireless sensor's location generally needs to be known for its data to be meaningful. Localization is necessary to provide a physical context to a sensor's readings. For example, in many applications such as environmental monitoring, sensor readings without knowledge of the location where the readings were obtained are meaningless. Location information is further necessary for services such as intrusion detection, inventory and supply chain management, and surveillance. Location discovery is also becoming an important component for establishing correspondence between the Internet and the physical world; and mechanism for discovering spatial relationships among wireless nodes (i.e., objects or people).

Since ad hoc networks do not include fixed base stations, the wireless nodes need to dynamically determine a communication pathway to route data packets. In general, the wireless nodes should determine the shortest route to transmit the data packets. However, this may be difficult since the wireless nodes may move and change location. This situation is further compounded as in many ad hoc wireless systems, multiple hops may be need in order to transmit the communication package to a desired location.

In many ad hoc networks, bandwidth resources may be used inefficiently. In a fully meshed ad hoc wireless network, data packages may be propagated ineffectively through the network wasting valuable bandwidth. Further, the number of connections required for a fully meshed ad hoc network may be bandwidth prohibitive.

Therefore, it would be desirable to provide a system and method that overcomes the above.

SUMMARY

In accordance with one embodiment, a method for location aware networking in a wireless ad-hoc network having a plurality of wireless nodes in a geographic area is disclosed. The method comprises: dividing the geographic area into a plurality of grids; determining a location of a particular wireless node; determining a corresponding grid where the particular wireless node resides; determining a cluster head for the corresponding grid; connecting corresponding wireless nodes in the corresponding grid to the cluster head, wherein the cluster head of the corresponding grid periodically gather data from the corresponding wireless nodes, aggregate the data and transmits the data to a gateway; and coupling the cluster head of the corresponding grid to cluster heads of each of the plurality of grids forming a pathway to the gateway, the cluster head of the corresponding grid transmitting the data through the pathway or directly to the gateway.

In accordance with one embodiment, a method for location aware networking in a wireless ad-hoc network having a plurality of wireless nodes in a geographic area is disclosed. The method comprises: dividing the geographic area into a plurality of grids; determining a corresponding grid for each of the plurality of wireless nodes resides; determining a cluster head for each of the plurality of grids; connecting corresponding wireless nodes in each grid to a corresponding cluster head of a respective grid, wherein the corresponding cluster head of each respective grid periodically gather data from the corresponding wireless nodes, aggregate the data and transmits the data to a gateway; and coupling each of the corresponding cluster heads of each of the respective grids together forming a pathway to the gateway.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Wireless sensor networks may provide three main functions with a single Physical (PHY) Layer/Media Access Control (MAC) layer: (1) data networking, (2) localization, and (3) synchronization/time transfer. In a wireless network, network connectivity and bandwidth need to be managed in order to support the above three functions under quasi-stationary to highly dynamic conditions. The present disclosure relates to a system and method wherein wireless nodes cooperatively form one or more wireless sub-networks independently of any fixed base station and/or hub infrastructure. Each wireless node may communicate directly with other wireless nodes within wireless range in order to determine an absolute position. The wireless nodes in each sub-network may calculate a cluster head node based on node centrality. The cluster head in each sub-network may communicate with one or more cluster heads in adjoining sub-networks to communicate data packages to a gateway in order to minimize power consumption of the wireless network system. The present system and method may work for a grid based wireless sensor network for quasi-stationary applications and cluster based for dynamic operation. In a grid based wireless network, each grid boundary defines the wireless nodes within the sub-network. The wireless nodes in each sub-network determining the cluster head. In cluster based, the sub-networks of wireless sensors are pre-determined with the cluster head selected. However, wireless sensors may change sub-networks and cluster heads may change during operation.

Figure 1A:
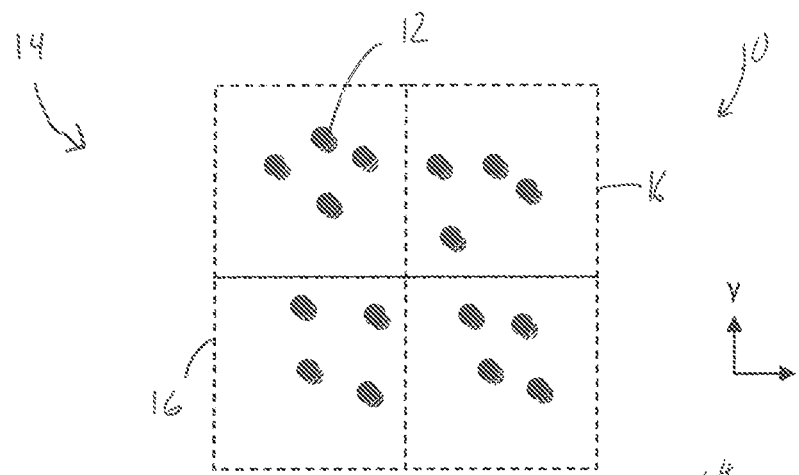
FIG. 1A-1C are exemplary diagrams depicting grid formations for ad hoc wireless networks in accordance with one aspect of the present application.
Figure 1B:
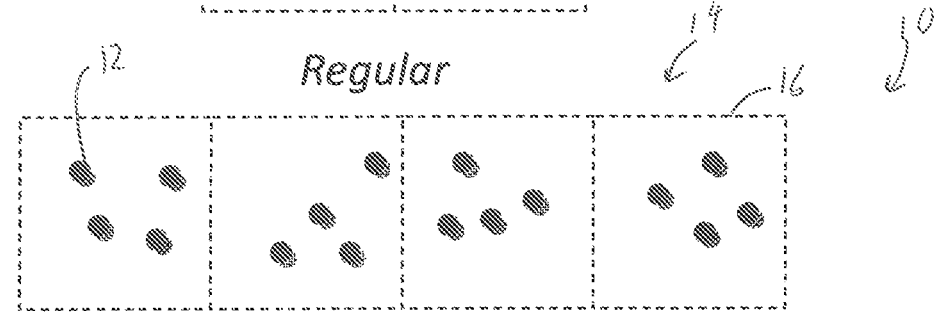
Figure 1C:
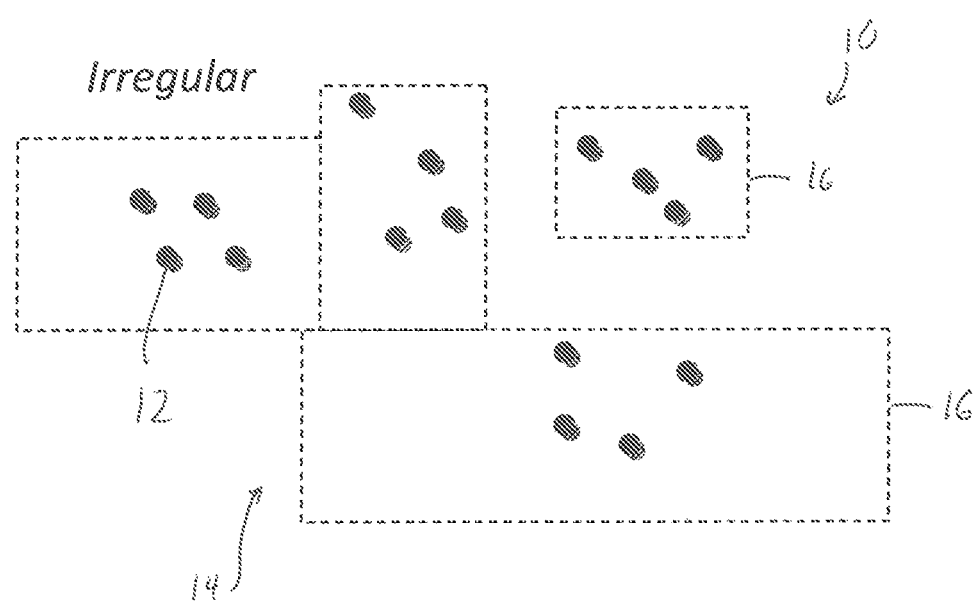

Referring to FIGS. 1A-1C, a wireless ad hoc network 10 may be seen. The wireless ad hoc network 10 is a dynamic type of network have a plurality of wireless nodes 12. Wireless nodes 12 may be added to, removed or moved from one location to another within the wireless ad hoc network 10 without notice. The wireless nodes 12 cooperatively form the wireless ad hoc network 10 independently of any fixed base station and/or hub infrastructure. Each wireless node 12 may communicate directly with other wireless nodes 12 within wireless range and indirectly with other wireless nodes 12 not in wireless range by relying on other wireless nodes 12 within wireless range to forward traffic on its behalf. The wireless nodes 12 may be any type of electronic device that is capable of creating, receiving, or transmitting information over a communications channel.

The wireless ad hoc network 10 may be formed in a geographic area 14. The geographic area 14 may be divided into a plurality of sections/grids 16. Each grid 16 may take on different sizes and shapes. While FIGS. 1A and 1B may show that each grid 16 is of a similar size and shape, this is just shown as one example. As may be seen in FIG. 1C, the grids 16 may be irregular in size and shape as well. Further, as shown in FIG. 1C, each grid 16 does not have to be directly connected to another grid 16.

Figure 2:
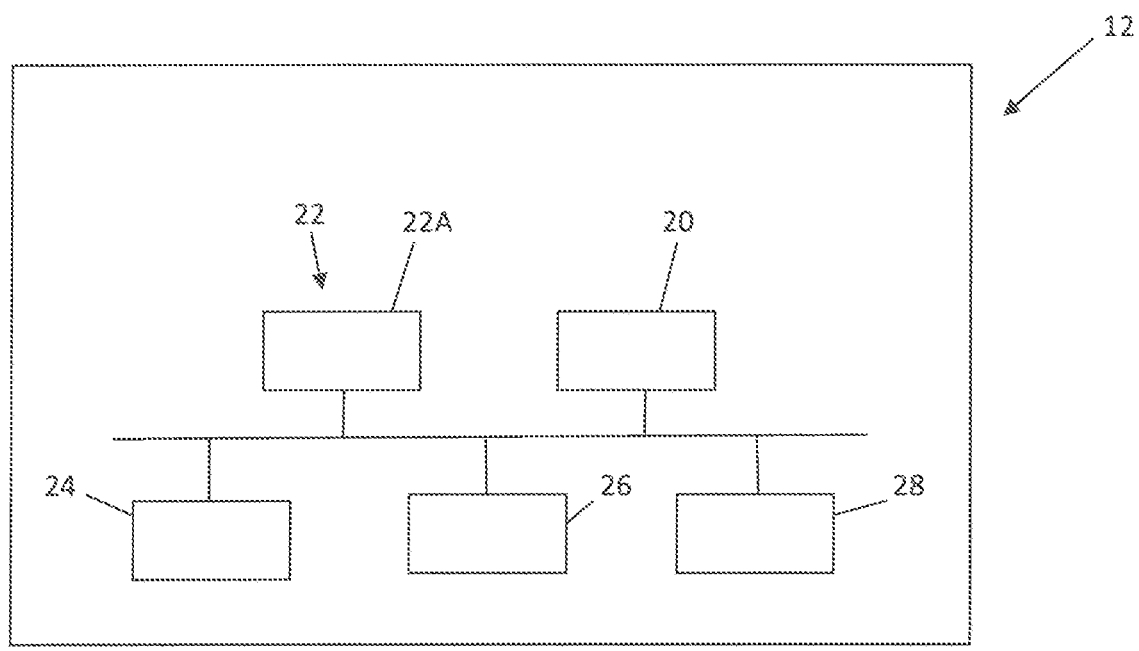
FIG. 2 is an exemplary block diagram of a wireless node used in the ad hoc wireless network of FIG. 1 in accordance with one aspect of the present application.

Referring to FIG. 2, a block diagram of one embodiment of a wireless node 12 may be seen. The wireless node 12 may have a sensor 20. The sensor 20 may be used to collect sensory data. For example, the sensor 20 may be used to collect noise data, vibration data, pollutant data, and/or other external sensory data.

The wireless node 12 may have a receiver/transmitter 22. The receiver/transmitter 22 may be used to send and receive data to and from the wireless node 12. In accordance with one embodiment, the receiver/transmitter 22 may be an Ultra-Wideband (UWB) receiver/transmitter 22A. The UWB receiver/transmitter 22A may operate in the unlicensed frequency bands of 3 GHz to 6 GHz.

The wireless node 12 may have memory 24. The memory 24 may be used to store sensory data from the sensor 20. In some embodiments, sensory data could be transmitted elsewhere for storage via the receiver/transmitter 22. The memory 24 may also be used as a computer-readable storage medium containing instructions for executing the cluster head selection and/or triadic localization metric as will be described below. Such instructions can be executed by a processor 26. The wireless node 12 may be powered by a power source 28. The power source 28 may be a battery or similar device.

Figure 3:
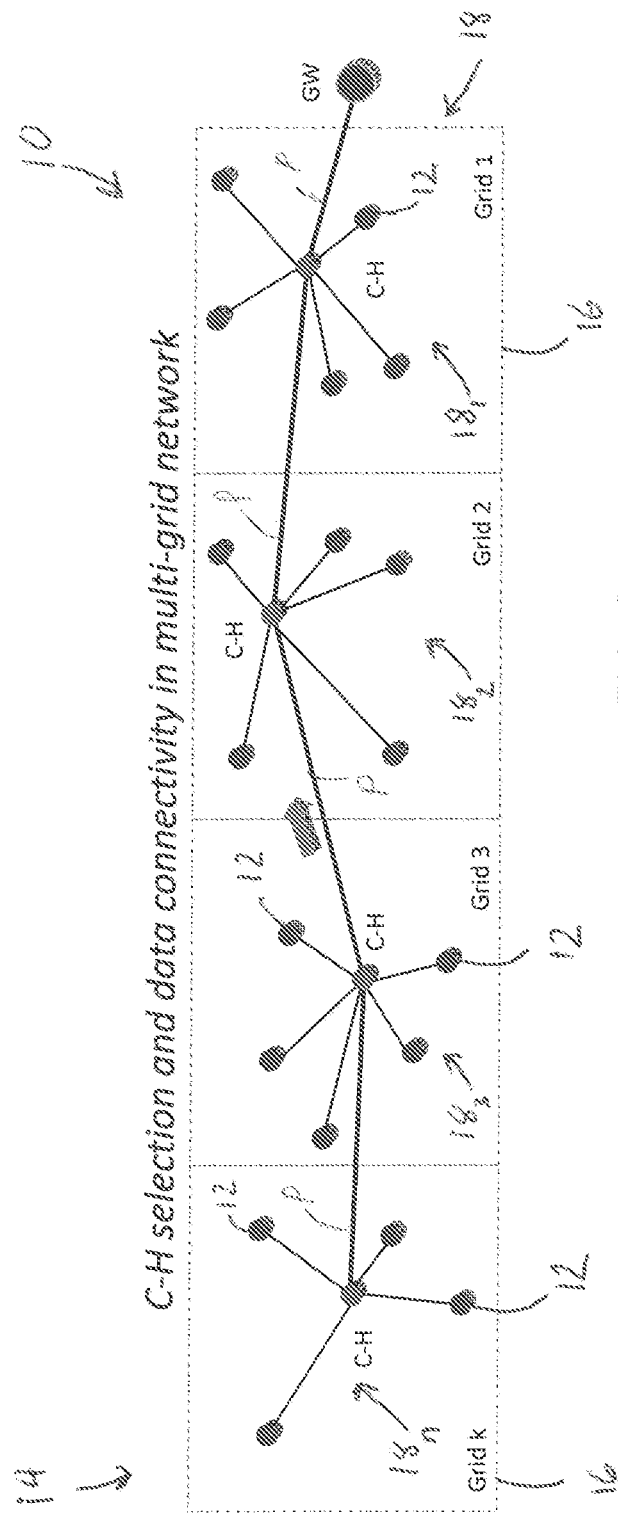
FIG. 3 is an exemplary ad hoc wireless network broken into grids, wherein each grid has a corresponding cluster head in accordance with one aspect of the present application.

Referring to FIG. 3, in the wireless ad hoc network 10, information relating to the position of the wireless nodes 12 may be needed for different reasons such as, but not limited to, coverage area management, geographic-aware routing for more efficient data routing (i.e., multi-hops data routing) in larger networks that span large geographic regions and the like. The wireless ad hoc network 10 may perform a triadic localization metric as disclosed below for location determination.

When a location of a wireless nodes 12 has been determined, the grid 16 in which the wireless node 12 resides can be determined. The wireless nodes 12 in each grid 16 may form a sub-network 18. The wireless nodes 12 in each sub-network 18 preform a calculation as discussed below to select one of the wireless nodes 12 in the sub-network 18 to be a cluster head C-H. Each cluster head C-H may manage the corresponding sub-network 18. The cluster heads C-H may be used to gather data from all of the wireless nodes 12 in the corresponding sub-network 18 and to transmit this data to another cluster head C-H in another grid 16 and/or to a gateway GW.

Each grid 16 may be scalable. The grids 16 may be adjustable in shape and size based on the number of wireless nodes 12. This may enable one to control access to bandwidth in order to minimize the power consumption of the wireless node 12. Further, the designation of a cluster head C-H, through which data packages may be communicated with in adjoining sub-networks 18 to communicate the data packages to a gateway GW, may minimize power consumption of the ad hoc wireless network 10 and avoid flooding.

As may be seen in FIG. 3, the ad-hoc network 10 is shown in the geographic area 14. The geographic area 14 may be divided into a plurality of grids 16. In this embodiment, the grids 16 may be labeled as Grid 1, Grid 2, Grid 3, and Grid n. Each grid 16 may have a plurality of wireless nodes 12. The wireless nodes 12 in each grid 16 forms an independent sub-network 18. Thus, the plurality of wireless nodes 12 in Grid K forms a sub-network $18_k$, the plurality of wireless nodes 12 in Grid 1 forms a sub-network $18_1$, the plurality of wireless nodes 12 in Grid 2 forms a sub-network $18_2$ and the plurality of wireless nodes 12 in Grid 3 forms a sub-network $18_3$.

When a wireless node 12 joins the ad-hoc wireless network 10, location discovery may be performed to determine a position of the wireless node 12. Once a position of the wireless node 12 is determined, the grid 16 where the wireless node 12 may reside may be determine.

The wireless nodes 12 within a corresponding grid 16 may be used to determine the cluster head C-H for that specific grid 16 as may be disclosed below. In general, the cluster head C-H for each grid 16 may be determined by node centrality as may be discussed below. Once the cluster head C-H for a specific grid 16 has been determined, each wireless node 12 within the specific grid 16 may connect to the cluster head C-H. It should be noted that multi-hops may be required to achieve this connection. When multiple hops are required, location awareness can determine the wireless node 12 closest to the cluster head C-H to minimize the number of hops required.

Once each wireless node 12 within the specific grid 16 connects to the corresponding cluster head C-H, the cluster head C-H may serve as a grid relay. The cluster head C-H may be used to periodically gather sensed data from the wireless nodes 12 within the corresponding grid 16 and aggregate the data in an effort to remove redundancy among correlated values. The cluster head C-H may generate a Time Division Multiple Access (TDMA) schedule through which the wireless nodes 12 may receive a time slot for data packet transmission. The cluster head C-H may transmit the aggregated data to nearby cluster heads C-H in another grid 16 or directly to the gateway 22.

As may be seen in FIG. 3, the cluster heads C-H may connect to form a communication pathway P to the gateway GW. As may be seen, the wireless nodes 16 in Grid n may send data packets to the cluster head C-H in Grid n. The cluster head C-H in Grid n may collect/sort through the data packets. The cluster head C-HI in Grid n may then transmit the aggregated data packets to the gateway GW via the cluster heads C-H in Grid 3, Grid 2 and Grid 1. Thus, the cluster heads C-H may establish a 'smooth' topology for the exchange of data packets to and from the gateway GW. With a smooth topology, bandwidth is more easily scheduled leading to power savings. Since, the cluster heads C-H may be established based on a centralized location, the path to the gateway GW (the primary destination for data packet traffic) can be optimized to further minimize power. As the topology is smooth and optimized, with bandwidth scheduled, the majority of the wireless nodes 12 can remain in a sleep mode minimizing the total power consumption of the ad hoc wireless network 10.

All communications in the wireless ad hoc network 10 may be based on TDMA as disclosed above. TDMA is a channel access method for shared-medium networks. It may allow multiple wireless nodes 12 to share the same frequency channel by dividing the signal into different time slots. Thus, each TDMA frame may contain small time slots where each wireless node 12 may be allowed to transmit in. The time slots may be sequentially numbered so each wireless node 12 may know when it is able to transmit data. Thus, each wireless node 12 may "sleep" or go into a low power mode during times it is unable to transmit data and then may know when to 'wake up' to perform localization or other functions. When 'activated', the wireless node 12 can be assigned dedicated bandwidth or be given a slot pool for CSMA. Cluster heads C-H may be freed to use part of the TDMA frame for cluster head to cluster head communications (while its assigned nodes are sleeping) and part for local communications.

Figure 4:
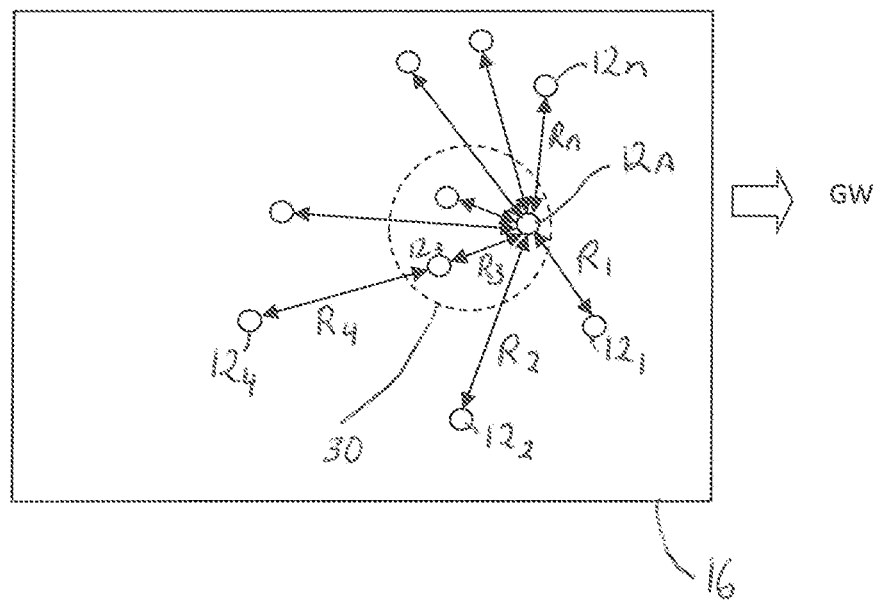
FIG. 4 is an exemplary grid of the ad hoc wireless network showing cluster head selection in accordance with one aspect of the present application.

Referring to FIG. 4, the process for selecting the cluster head C-H may be similar whether the sub-network 18 operates in grid or cluster mode. In general, the cluster head C-H may be selected based on node centrality. In the present embodiment, node centrality may be determined by the wireless node 16 that approaches a "cluster center". Criterion is the sum of squared distances from a specified wireless node 12 to all other wireless nodes 12 in the grid 16 divided by the number of wireless nodes 12 in the grid 16 as shown in the equation below. It should be noted that this is equivalent to minimizing the sum of squared Euclidean distances.

$$\frac{R_1^2 + R_2^2 + \ldots + R_n^2}{n} = C$$

As may be seen in FIG. 4, measurement C for the wireless node $12_A$ may be disclosed. As disclosed above, the distance from the wireless node $12_A$ to each of the other wireless nodes 12 in the grid 16 may be determined. The distances to each of the different wireless nodes 16 may be identified as $R_1$ to wireless node $12_1$; $R_2$ to wireless node $12_2$; $R_3$ to wireless node $12_3$; ... and $R_n$ to wireless node $12_n$. It should be noted that multiple hops may be needed to measure the distance to one or more of the wireless nodes 12. In the above embodiment, multiple hops may be needed to measure the distance to wireless node $12_4$. For this case, the distance to wireless node $12_4$ would be the sum of the distance $R_3+R_4$.

Different techniques may be used to determine the distances to each of the different wireless nodes 16. In accordance with one embodiment, RF ranging protocols as disclosed in co-pending U.S. patent application Ser. Nos. 15/982,734 and 16/041,047, both of which are incorporated by reference, may be used.

This measurement C may then be we weighted by the distance from the "Candidate Nodes" 30 from the gateway GW. The "Candidate Nodes" 30 may be those wireless nodes 12 having the shortest distance as calculated above. Given multiple cluster head C-H options, the cluster head C-H closest to the gateway GW may be selected. This may guarantee that the cluster head C-H selected both centralized and in the trajectory to the gateway GW. The cluster heads C-H form a 'backbone' for message forwarding to/from gateway GW or between other cluster heads C-H in the ad hoc wireless network 10. Thus, in the embodiment shown in FIG. 4, if the measurement for C is approximately the same for wireless nodes, $12_A$ and $12_3$, the wireless node $12_A$ may be selected as the cluster head C-H since the wireless node $12_A$ is closest to the gateway GW.

Since the ad hoc wireless network 10 is dynamic and/or for power saving reasons, cluster heads C-H may periodically change to allow the previous cluster head C-H to 'retire' and enter a 'sleep' mode. The alternative cluster head C-H may be chosen using the above process. Such is intended to extend the operating life of the ad hoc wireless network 10.

'Power remaining' is a metric available from every wireless node 12 within a grid 16 and/or within the ad hoc wireless network 10. The ad hoc wireless network 10 may be designed to conserve power and to minimize power consumption. Topology/connectivity may be established to "sleep" in order to minimize the need for certain wireless nodes 12 and/or cluster heads C-H to 'wake up' in order to conserve power.

Figure 5A:
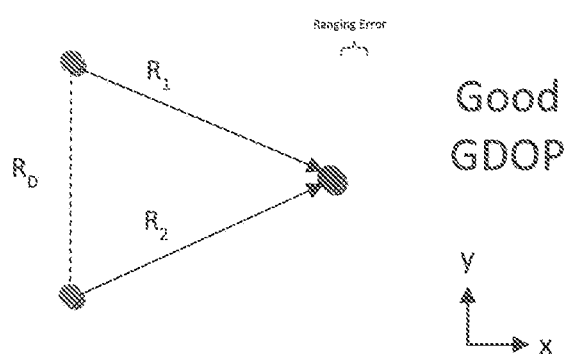
FIG. 5A-5C are exemplary wireless node configurations for triadic localization in accordance with one aspect of the present application.
Figure 5B:
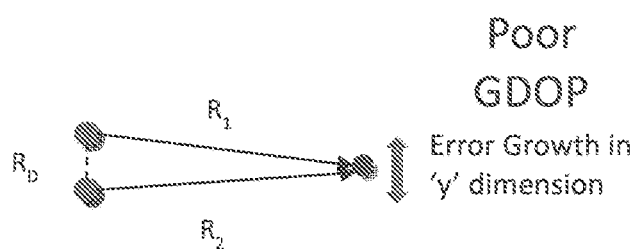
Figure 5C:
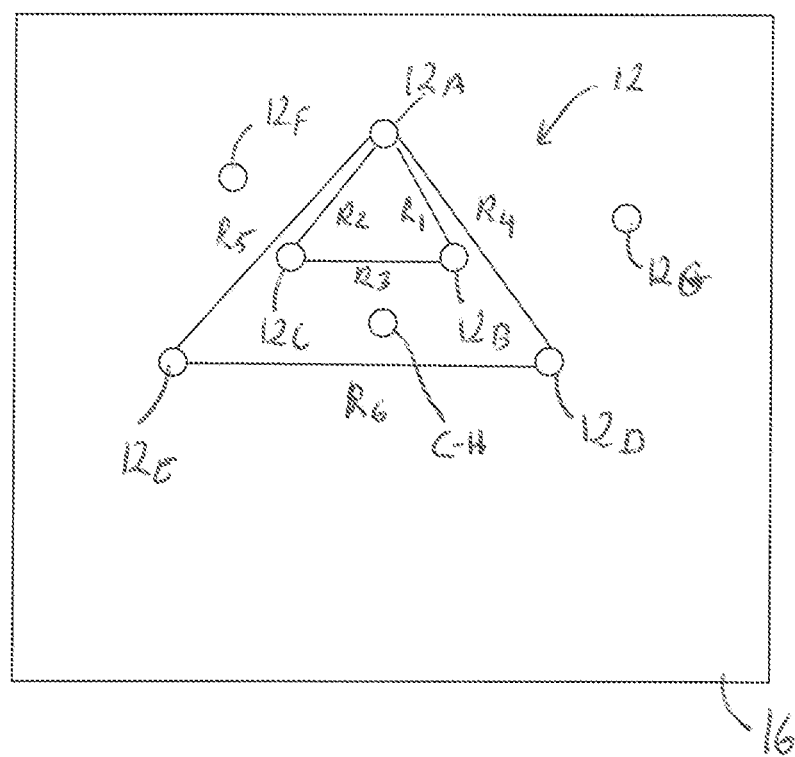

Referring to FIGS. 5A-5C, a location discovery for the ad hoc wireless network 10 may be disclosed. Location determination is generally a primary network function. However, the bandwidth used for ranging needs to be minimized to free network data captivity. Thus, ranging connections should be performed only if beneficial.

Localization performance is generally predicated on geometry. Geometric dilution of precision (GDOP) increases position uncertainty, at least in one dimension. The idea of GDOP to state how errors in the measurement will affect the final state estimation. This can be defined as:

GDOP=Δ(Output Location)/Δ(Measure Data)

Based on the above equation, one can geometrically imagine errors on a measurement resulting in the term changing. Thus, ideally small changes in the measured data will not result in large changes in output location.

Referring to FIGS. 5A-5B, in the present embodiment, Triadic First Order Clustering may be used to identify the best wireless nodes 12 for localization. A local optimization algorithm may search for a satisfactory group (cluster of wireless nodes 12), although not necessarily exhaustive group of wireless nodes 12 for localization. The GDOP is minimized when $R_1=R_2=R_D$. This implies an algorithm that minimizes the quantity:

$(R_1-R_2)^2+(R_1-R_D)^2+(R_2-R_D)^2=\mu$

As may be seen in FIG. 5A, if all $R_n$ are equal, then based on the above equation, u=0. However, if the distances of $R_n$ are not approximately equal, the GDOP increases. As may be seen in FIG. 5B, $R_1=R_2>R_D$, as the difference between $R_D$ and $R_1$ and $R_2$, grows, the larger the error growth in the Y-dimension. If two candidate wireless nodes 12 are not connected, then $R_D=\infty$ and the triad is rejected. Since it may be difficult to find a triad of wireless nodes wherein $R_1=R_2=R_D$. The algorithm may look for wireless nodes 12 wherein $R_1 \approx R_2 \approx R_D$ wherein u may not exceed a predefined threshold value. If u does exceed the predefined threshold value, different wireless nodes may be used to form the triad for localization.

As a secondary metric, the triad of distances, $R_1+R_2+R_D=r$, may be maximized. In other words, given equivalent m in multiple triads, the algorithm may choose the triad with the maximum r. This creates the largest geometry, beneficial under dynamic conditions. As may be seen in FIG. 5C, the wireless node $12_A$ may form a triad for localization with wireless nodes $12_B$ and $12_C$ wherein $R_1 \approx R_2 \approx R_3$. Similarly, the wireless node $12_A$ may form a triad for localization with wireless nodes $12_D$ and $12_E$ wherein $R_4 \approx R_5 \approx R_6$. However, since $R_4+R_5+R_5=r_{456}$ is greater than $R_1+R_2+R_3=r_{123}$, the wireless nodes $12_A$, $12_D$ and $12_E$ may be used to form a triad for localization.

When a wireless node 12 joins the ad hoc wireless network 10, the wireless node 12 ranges to other wireless nodes 12. Thus, in the present embodiment, when the wireless nodes $12_A$ joins, the wireless node $12_A$ may range with other wireless nodes $12_B$, $12_C$, $12_D$, $12_E$, $12_F$, $12_G$ and any other wireless nodes 12 within a predefined range. It should be noted, that when performing Triadic First Order Clustering, the wireless nodes 12 forming the cluster may extend across grids 16. Thus, while the present embodiment shows all of the wireless nodes 12 forming the cluster in the same grid 16, the wireless nodes 12 forming the cluster may extend across adjoining grids 16. From these measurements, the wireless node $12_A$ constructs a set of triads: [(n,m); $m_{n,m}$, r], where (n,m) represent ranging pairs. From this set, the best ranging configuration is determined, with bandwidth scheduled to perform this ranging 'service'. By operating with 'triads', the maximum system bandwidth that must be allocated for ranging can be determined a priori given the number of wireless nodes 12 in the cluster.

All the wireless nodes 12 within the grid 16 may range with the cluster-head C-H creating a common reference point. When beacons are available, the same process may be used to determine the wireless nodes 12 best suited to 'forward' the absolute position.

Figure 6:
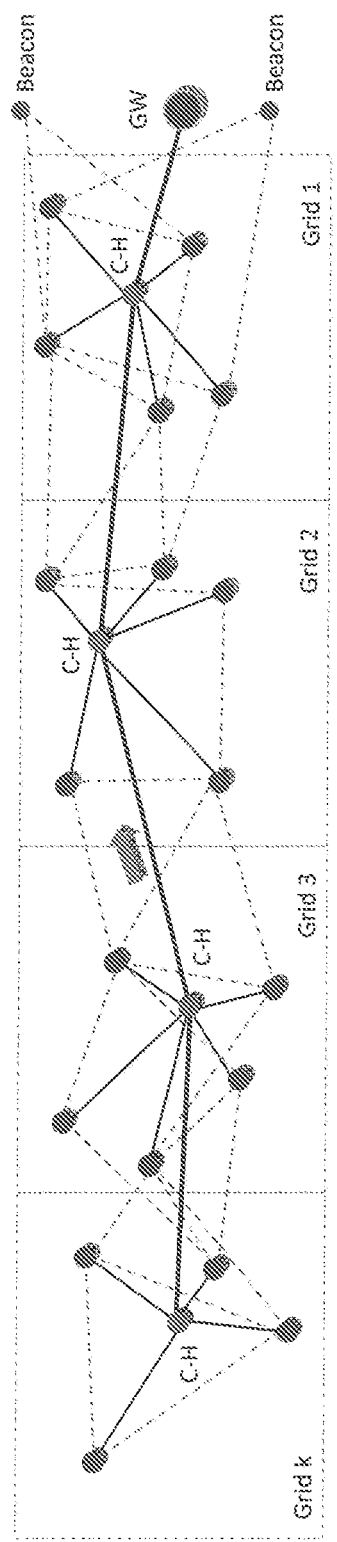
FIG. 6 is an exemplary ad hoc wireless network broken into grids, wherein each grid has a corresponding cluster head showing triads extending across multiple grids in accordance with one aspect of the present application.

Referring to FIG. 6, each wireless node 12 may forms an 'optimum' triad for localization. As shown in FIG. 6, the triad can cross grid 16 boundaries. The grid 16 may be used for data networking, not localization. Every wireless node 12 also ranges to their respective cluster head C-H, and the cluster heads C-Hs range between each other.

The ad hoc wireless network 10 may have one or more Beacons as shown in FIG. 6. The beacons may have the same triadic operation, reaching to the wireless nodes with the best geometry and farthest distance. In general, beacons may be defined as a small transmitter that can be placed at a known location, which transmits a continuous or periodic radio signal with limited information content (e.g. its identification or location), on a specified radio frequency.

The grid 16 may be used to control bandwidth usage for communications. By definition, each wireless node 12 has ranging measurements to two other wireless nodes 12 plus the cluster head C-H. Bandwidth may be allocated for the measurement, irrespective of which grid 16 the supporting wireless nodes 12 resides. If network is quasi-stationary, ranging measurements can be scheduled on a low duty cycle.

To see how the present invention may control bandwidth and lower power consumption, in FIG. 6, the ad-hoc wireless network 10 may be seen with 26 wireless nodes 12. Operating full mesh, 325 connections would be required, which is prohibitive. In the formation below there may be 33 ranging only connections, plus an additional 19 for wireless node 12 to cluster head C-H, and 4 for cluster head C-H to cluster head C-H. This is a total of 56 connections for all communications and ranging. This is an average of 2.15 connections per node.

The foregoing description is illustrative of particular embodiments of the application, but is not meant to be a limitation upon the practice thereof. The following claims, including all equivalents thereof, are intended to define the scope of the application.

What is claimed is:

1. A method for location aware networking in a wireless ad-hoc network having a plurality of wireless nodes in a geographic area comprising:

dividing the geographic area into a plurality of grids;
determining a location of a particular wireless node;
determining a corresponding grid where the particular wireless node resides;
determining a cluster head for the corresponding grid;
connecting corresponding wireless nodes in the corresponding grid to the cluster head, wherein the cluster head of the corresponding grid periodically gather data from the corresponding wireless nodes, aggregate the data and transmits the data to a gateway; and
coupling the cluster head of the corresponding grid to cluster heads of each of the plurality of grids forming a pathway to the gateway, the cluster head of the corresponding grid transmitting the data through the pathway or directly to the gateway;
wherein determining the cluster head for the corresponding grid comprises:
calculating the Euclidean distances between each candidate node for cluster head to each of the corresponding wireless nodes in the corresponding grid;
calculating a criterion for each candidate node, wherein the criterion is the sum of squared distances from each candidate node for cluster head to each of the corresponding wireless nodes divided by the number of corresponding wireless nodes; and
selecting one candidate node as the cluster head for the corresponding grid, wherein the one candidate node selected has the least criterion value.

2. The method of claim 1, comprising generating a Time Division Multiple Access (TDMA) schedule by the cluster head of the corresponding grid for the corresponding wireless nodes in the corresponding grid.

3. The method of claim 1, comprising dividing the geographic area into a plurality of grids, wherein the plurality of grids is irregular in shape.

4. The method of claim 1, comprising dividing the geographic area into a plurality of grids, wherein at least one of the plurality of grids is detached from remaining grids of the plurality of grids.

5. The method of claim 1, comprising dividing the geographic area into a plurality of grids, wherein each of the plurality of grids is scalable.

6. The method of claim 1, comprising selecting the one candidate node closest to the gateway when multiple candidate nodes have criterion values within a predefined difference.

7. A method for location aware networking in a wireless ad-hoc network having a plurality of wireless nodes comprising:
dividing a geographic area to a plurality of scalable grids;
determining a location of a particular wireless node;
determining a corresponding grid where the particular wireless node resides;
determining a cluster head for the corresponding grid;
connecting corresponding wireless nodes in the corresponding grid to the cluster head, wherein the cluster head of the corresponding grid periodically gather data from the corresponding wireless nodes, aggregate the data and transmits the data to a gateway; and
coupling the cluster head of the corresponding grid to cluster heads of each of the plurality of grids forming a pathway to the gateway, the cluster head of the corresponding grid transmitting the data through the pathway or directly to the gateway;
wherein determining a location of a particular node comprises:

selecting a group of wireless nodes for local optimization with the particular wireless node; and
determining a pair of wireless nodes from the group of wireless nodes for local optimization wherein the pair of nodes selected minimizes a geometric dilution of precision (GDOP), wherein minimizing the geometric dilution of precision (GDOP) comprises locating the pair of wireless nodes wherein a distance $R_1$ from a first wireless node of the pair of wireless nodes to the particular wireless node is equal to a distance $R_2$ from a second wireless node of the pair of wireless nodes to the particular wireless node and is equal to a distance $R_D$ from the first wireless node of the pair of wireless nodes to the second wireless node of the pair of wireless nodes.

8. The method of claim 7, wherein the pair of wireless nodes are selected for local optimization when a GDOP value u defined as:

$$(R_1-R_2)^2(R_1-R_D)^2+(R_2-R_D)^2=\mu$$

does exceed the predefined threshold value.

9. The method of claim 8, comprising maximizing a triad distance r as defined by $r=R_1+R_2+R_D$.

10. The method of claim 7, wherein the particular wireless node and the pair of wireless nodes are in different grids.

11. A method for location aware networking in a wireless ad-hoc network having a plurality of wireless nodes in a geographic area comprising:
dividing the geographic area into a plurality of grids;
determining a location of a particular node;
determining a corresponding grid for each of the plurality of wireless nodes resides;
determining a cluster head for each of the plurality of grids;
connecting corresponding wireless nodes in each grid to a corresponding cluster head of a respective grid, wherein the corresponding cluster head of each respective grid periodically gather data from the corresponding wireless nodes, aggregate the data and transmits the data to a gateway; and
coupling each of the corresponding cluster heads of each of the respective grids together forming a pathway to the gateway;
wherein determining a location of a particular node comprises:
selecting a group of wireless nodes for local optimization with the particular node; and
determining a pair of wireless nodes from the group of wireless nodes for local optimization wherein the pair of nodes selected minimizes a geometric dilution of precision (GDOP), wherein minimizing the geometric dilution of precision (GDOP) comprises locating the pair of wireless nodes wherein a distance $R_1$ from a first wireless node of the pair of wireless nodes to the particular node is equal to a distance $R_2$ from a second wireless node of the pair of wireless nodes to the particular node and is equal to a distance $R_D$ from the first wireless node of the pair of wireless nodes to the second wireless node of the pair of wireless nodes.

12. The method of claim 11, comprising dividing the geographic area into a plurality of grids, wherein the plurality of grids is irregular in shape.

13. The method of claim 11, comprising dividing the geographic area into a plurality of grids, wherein each of the plurality of grids is scalable.

14. The method of claim 11, wherein determining the cluster head for each of the plurality of grids comprises:

calculating the Euclidean distances between each candidate node for cluster head to each of the corresponding wireless nodes in the respective grid;

calculating a criterion for each candidate node, wherein the criterion is the sum of squared distances from each candidate node for cluster head to each of the corresponding wireless nodes in the respective grid divided by the number of corresponding wireless nodes in the respective grid; and selecting one candidate node as the cluster head for the respective grid, wherein the one candidate node selected has the least criterion value.

15. The method of claim 14, comprising selecting the one candidate node closest to the gateway when multiple candidate nodes have criterion values within a predefined difference.

16. The method of claim 11, wherein the pair of wireless nodes are selected for local optimization when a GDOP value u, defined as:

$$(R_1-R_2)^2+(R_1-R_2)^2+(R_2-R_D)^2=\mu$$

does exceed the predefined threshold value.

* * * * *